(12) United States Patent
Tokutsu (10) Patent No.: US 8,605,343 B2
(45) Date of Patent: Dec. 10, 2013

(54) AUTOMATIC DOCUMENT FEEDER, METHOD OF TRANSPORTING DOCUMENT, AND IMAGE READING APPARATUS

(75) Inventor: Akihito Tokutsu, Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 245 days.

(21) Appl. No.: 13/166,952

(22) Filed: Jun. 23, 2011

(65) Prior Publication Data
US 2012/0008178 A1 Jan. 12, 2012

Related U.S. Application Data

(60) Provisional application No. 61/362,083, filed on Jul. 7, 2010.

(51) Int. Cl.
*H04N 1/04* (2006.01)
(52) U.S. Cl.
USPC ............ 358/498; 358/474; 358/496; 358/497

(58) Field of Classification Search
USPC .......................... 358/498, 474, 496, 497, 482
See application file for complete search history.

(56) References Cited

U.S. PATENT DOCUMENTS 8,146,919 B2 * 4/2012 Won ............................. 271/301
2009/0251744 A1 10/2009 Tokutsu

* cited by examiner

*Primary Examiner* — Houshang Safaipour
(74) *Attorney, Agent, or Firm* — Turocy & Watson, LLP (57) ABSTRACT

According to the embodiment, an automatic document feeder includes a first transport unit which transports a document fed from a document tray to a reading portion in a first direction after turning over the document, and a second transport unit which transports the document fed from the document tray to the reading portion in a second direction and transports the document passed through the reading portion to the reading portion in the first direction after turning over the document. When an image on one side of the document is read, the document is sorted to be transported to the first transport unit, and when images on both sides of the document are read, the document is sorted to be transported to the second transport unit.

21 Claims, 5 Drawing Sheets

AUTOMATIC DOCUMENT FEEDER, METHOD OF TRANSPORTING DOCUMENT, AND IMAGE READING APPARATUS

CROSS-REFERENCE TO RELATED APPLICATION

This application is based upon and claims the priority of U.S. Provisional Application No. 61/362,083, filed on Jul. 7, 2010, the entire contents of which are incorporated herein by reference.

FIELD

Embodiments described herein relate generally to an automatic document feeder which can automatically feed a document in an image reading portion and read one side or both sides of the document, and to an image reading apparatus reading the document transported by the automatic document feeder.

BACKGROUND

Conventionally, an image forming apparatus such as an MFP includes a scanner unit and a printer unit. The scanner unit reads a document, and image data read by the scanner unit is processed so as to be printed by the printer unit.

In addition, the image forming apparatus is provided with an automatic document feeder (ADF), and the scanner unit reads the document transported by the ADF or a document placed on a platen. Moreover, the ADF transports the document so that both sides of the document can be read.

When both sides of the document are read, the document loaded on a document tray is fed to the scanner unit from the uppermost page of the document in order, and the front side of the document is read. Thereafter, the document is switched back so as to be reversed, and the back side of the document is read. After the back side is read, the document is idly reversed by means of a reversing mechanism and discharged from a paper discharge port, whereby the document is discharged to a paper discharge tray with the front side down in the same page order as before the document is fed.

In conventional automatic document feeders, when both sides of the document are read, the document needs to be switched back so as to be reversed, or the idle reverse needs to be performed when the document is discharged. Accordingly, there is a problem of a decrease in productivity.

DETAILED DESCRIPTION

An automatic document feeder according to one embodiment including:

a document tray loaded with a document, a first transport unit transporting the document fed from the document tray to a reading portion in a first direction after turning over the document, a second transport unit transporting the document fed from the document tray to the reading portion in a second direction opposite to the first direction, and transporting the document passed through the reading portion to the reading portion in the first direction after turning over the document, a first gate sorting the document to transport the document to the first transport unit when an image on one side of the document is read, and to transport the document to the second transport unit when images on both sides of the document are read, and a paper discharge tray to which the document is discharged after the document is transported to the reading portion in the first direction.

Hereinafter, an image forming apparatus including the automatic document feeder according to one embodiment will be described with reference to the drawings. In the respective drawings, the same reference numerals will be marked on the same places.

Figure 1:
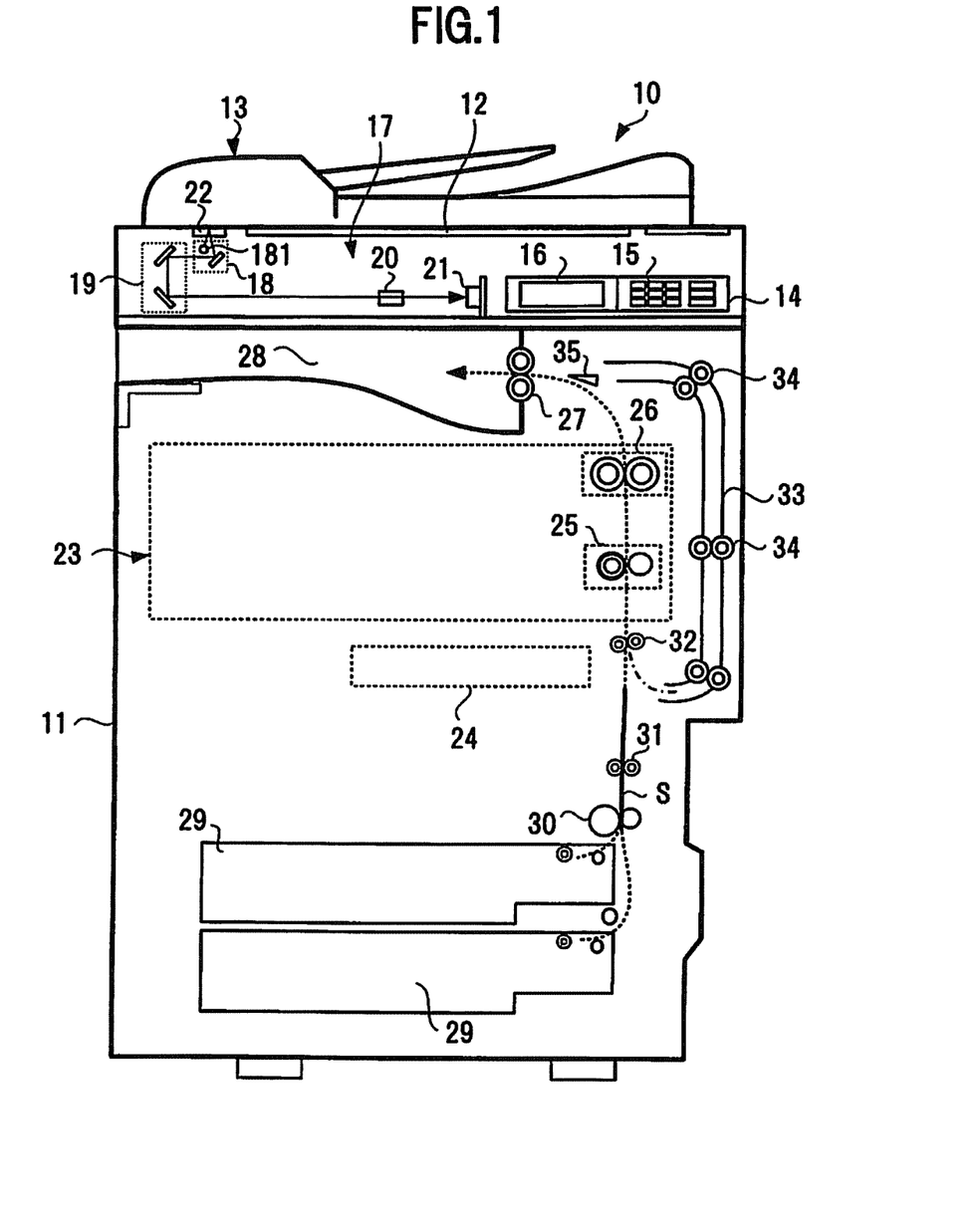
FIG. 1 is a configuration view illustrating an image forming apparatus including an automatic document feeder according to one embodiment.

FIG. 1 is a configuration view illustrating an image forming apparatus. An image forming apparatus 10 is, for example, an MFP (multi-function peripheral) which is a multi-function machine, a printer, or a copier. In the following description, the MFP will be taken for example as the image forming apparatus 10.

The upper portion of a body 11 of the MFP 10 is provided with a transparent platen 12 and a document reading portion 22 configured with a glass window. On the platen 12, an automatic document feeder (ADF) 13 is provided to be opened and closed freely. The upper portion of the body 11 is also provided with an operation panel 14. The operation panel 14 includes various operation keys 15 and a touch panel type display portion 16.

A scanner unit 17 is provided below the platen 12 of the MFP 10. The scanner unit 17 reads the image of a document which is transported to the reading portion 22 by the ADF 13 or the image of, a document placed on the platen 12. The scanner unit 17 includes a first carriage 18 and a second carriage 19.

Figure 2:
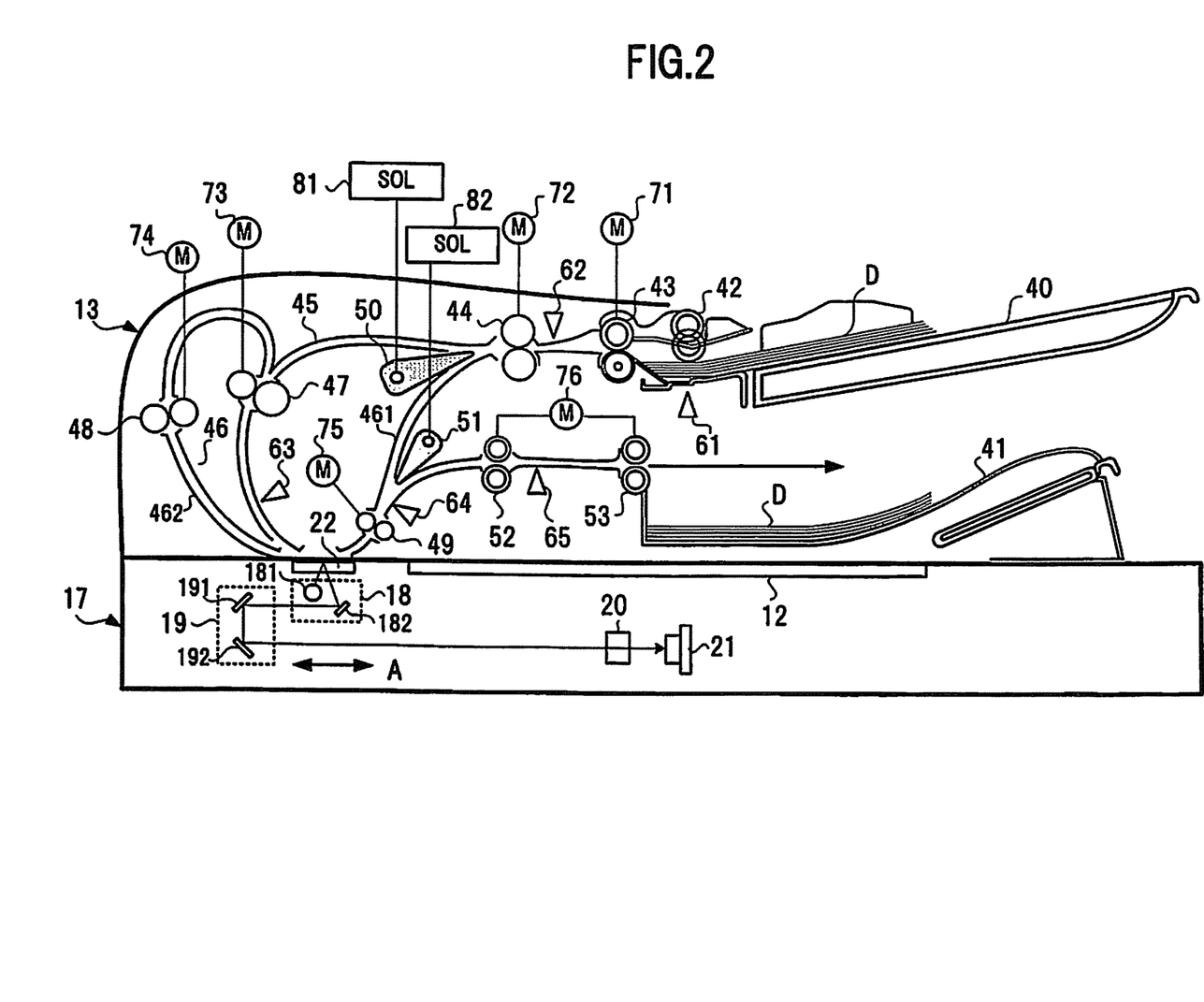
FIG. 2 is an enlarged configuration view illustrating the automatic document feeder.

As shown in FIG. 2, the first carriage 18 includes a light source portion 181 and a mirror 182 which expose and scan a document. The second carriage 19 includes mirrors 191 and 192 reflecting light reflected from the mirror 182, and guides the light reflected from the mirror 192 to a CCD 21 through a lens 20. The CCD 21 is an image sensor. The light reflected from the document undergoes photoelectric conversion by the CCD 21, and electric signals from the CCD 21 undergo image processing to generate image data.

When the scanner unit 17 reads the document transported by the ADF 13, the first carriage 18 is fixed to the position of the reading portion 22, and the second carriage 19 is also positioned near the first carriage 18. A document D transported from the ADF 13 is irradiated with light from the light source 181 through the reading portion 22. The light reflected from the document D is reflected by the mirror 182 toward the second carriage 19.

When the scanner unit 17 reads the document placed on the platen 12, the first and second carriages 18 and 19 are moved in a direction A (FIG. 2) in parallel with the platen 12, whereby the document placed on the platen 12 is read. The first and second carriages 18 and 19 moves by a driver driving a scanning motor.

A printer unit 23 is provided inside the body 11. The printer unit 23 includes a photoconductive drum and a laser and processes the image data read by the scanner unit 17 or the image data created by a PC (Personal Computer) or the like to form an image on a sheet S.

The printer unit 23 scans and exposes the surface of the photoconductive drum by using, for example, a laser beam from a laser 24, thereby forming an electrostatic latent image on the photoconductive drum. Around the photoconductive drum, a charger, a developing device, a transfer device and the like are arranged. The electrostatic latent image of the photoconductive drum is developed by the developing device to form a toner image on the photoconductive drum. The toner image is transferred to the sheet S by a transfer device 25, and then the toner image transferred to the sheet S is fixed by a fixing device 26.

The fixing device 26 includes a fixing roller and a pressure roller. When the sheet S passes between the fixing roller and the pressure roller, the toner image on the sheet S is fixed onto the sheet S. The sheet S on which an image formation is completed by fixing of the toner image is discharged to a paper discharge portion 28 by paper discharge rollers 27.

The configuration of the printer unit 23 is not limited to the above-described example but can be established in various manners. Furthermore, when a color image is formed, the printer unit includes image forming portions for black, magenta, cyan, yellow, and the like.

The lower side of the body 11 is provided with a plurality of feeding cassettes 29 containing various sizes of the sheet S. Between the feeding cassettes 29 and the transfer device 25, separation rollers 30 taking the sheet S out of the feeding cassettes 29, transfer rollers 31, and resist rollers 32 are provided.

At the side opposite to the paper discharge portion 28, a reversing transport path 33 is provided. The reversing transport path 33 includes a plurality of rollers 34, and guides the sheet S in the direction of the transfer device 25 after reversing the sheet S. The reversing transport path 33 is used for double-sided printing. The sheet S passed through the fixing device 26 is guided to the paper discharge portion 28 or to the reversing transport path 33 by a sorting gate 35.

FIG. 2 is an enlarged configuration view illustrating the automatic document feeder (ADF) 13 and the scanner unit 17.

In FIG. 2, the ADF 13 includes a document tray 40 and a paper discharge tray 41 as well as pickup rollers 42 taking the document D out of the document tray 40, feeding rollers 43 feeding the document D sheet by sheet, and resist rollers 44 aligning the leading end of the document D.

The ADF 13 includes a first path 45 guiding the document D from the resist rollers 44 toward the reading portion 22 in the first direction, as a transport path of the document. The ADF 13 also includes a second path having an inside path 461 and an outside path 462.

The inside path 461 is provided inside the first path 45 and guides the document D from the resist rollers 44 to the reading portion 22 in the second direction (which is an opposite direction to the first direction). The outside path 462 is provided outside the first path 45, turns over the document D passed through the reading portion 22 from the inside path 461, and guides the document D to the reading portion 22 in the first direction.

In the middle of the first path 45, intermediate rollers 47 transporting the document D are provided. Furthermore, in the middle of the outside path 462, intermediate rollers 48 transporting the document D are provided. The outlet of the outside path 462 meets the midway point of the first path 45. The outside path 462 discharges the document D passed through the first path 45 and includes intermediate rollers 49 transporting the document D passed through the inside path 461 to the reading portion 22. The intermediate rollers 49 perform normal rotation or inverse rotation.

The ADF 13 includes a first gate 50 which sorts the document D picked up from the document tray 40 and passed through the resist rollers 44 so as to transport the document D to the first path 45 or to a second path 46. The ADF 13 also includes a second gate 51 which sorts the document D to transport the document D passed through the first path 45 to the paper discharge tray 41 or to the reading portion 22 from the inside path 461. The second gate 51 is at the outlet portion of the first path 45 and the inside path 461. In the paper discharge path from the second gate 51 to the paper discharge tray 41, paper discharge rollers 52 and 53 are provided.

In the document tray 40, a sensor 61 detecting the presence or absence of the document D is disposed, and between the feeding rollers 43 and the resist rollers 44, a sensor 62 detecting a state where the document D reaches the resist rollers 44 is disposed. A sensor 63 is disposed at the reading portion 22 side of the first path 45, and a sensor 64 is disposed in front of the intermediate rollers 49 of the inside path 461. A sensor 65 is disposed between the paper discharge rollers 52 and 53.

The ADF 13 also includes a motor 71 rotating the pickup rollers 42 and the feeding rollers 43, a motor 72 rotating the resist rollers 44, a motor 73 rotating the intermediate rollers 47, and a motor 74 rotating the intermediate rollers 48. Moreover, the ADF 13 includes a motor 75 which can rotate the intermediate rollers 49 to perform normal rotation or inverse rotation, and a motor 76 rotating the paper discharge rollers 52 and 53.

In addition, the ADF 13 includes solenoids 81 and 82 to switch the gates 50 and 51. When the solenoids 81 and 82 are turned ON and OFF, the leading end of the gates 50 and 51 moves to sort the transportation direction of the document.

Figure 3:
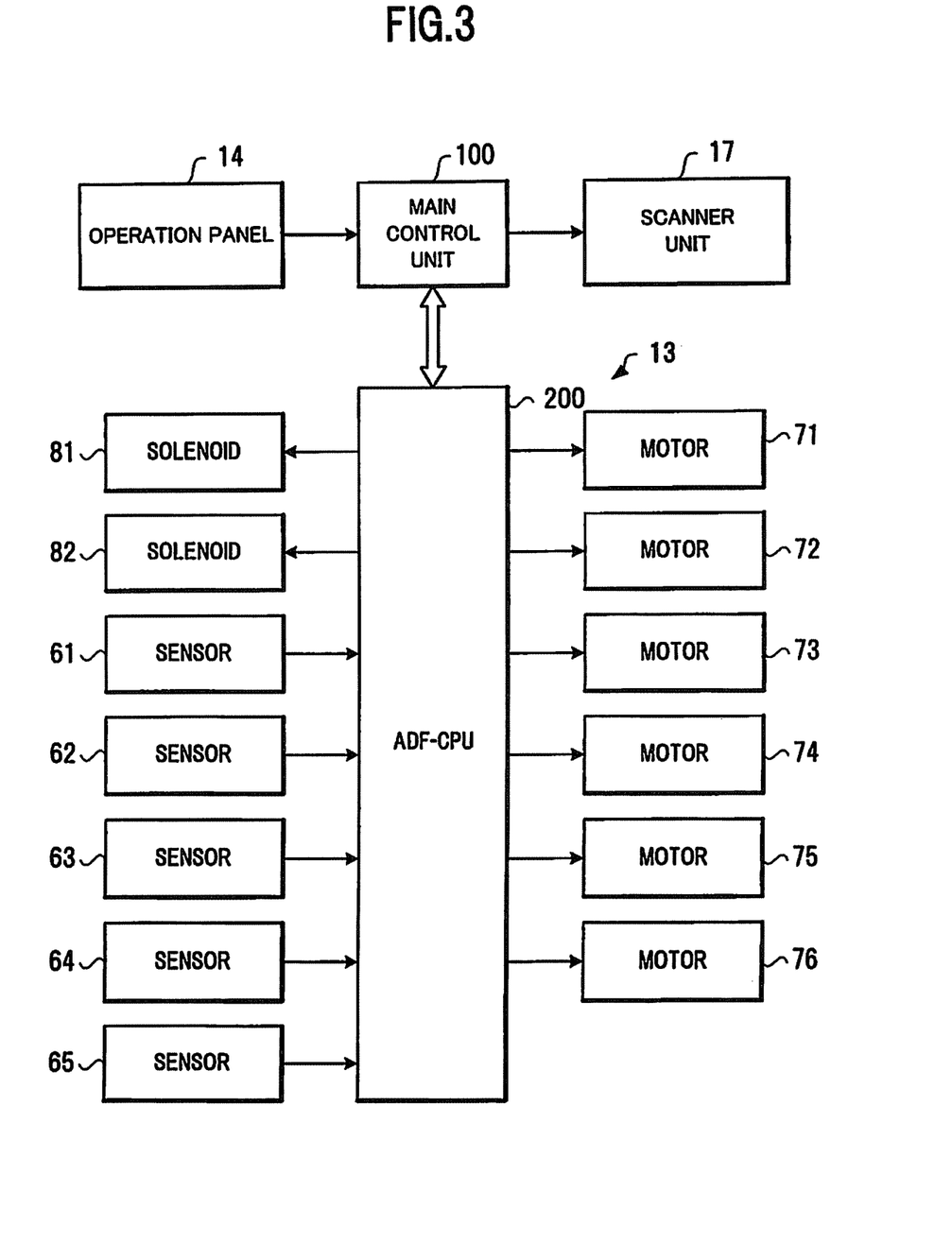
FIG. 3 is a block diagram illustrating a control system of the automatic document feeder.

FIG. 3 is a block diagram illustrating a control system in which the ADF 13 is taken as a subject. In FIG. 3, a main control unit 100 controlling the entire image forming apparatus 10 is connected to the operation panel 14. When a user operates the operation panel 14, various instructions are provided to the main control unit 100.

The main control unit 100 reads the document by controlling the scanner unit 17. Moreover, the main control unit 100 is connected to a CPU 200 (hereinafter, referred to as ADF-CPU) controlling the ADF 13. The ADF-CPU 200 controls the ADF 13 in cooperation with the main control unit 100.

Detection results from the sensors 61 to 65 are input in the ADF-CPU 200. In addition, the ADF-CPU 200 is connected to the solenoids 81 and 82 as well as the motors 71 to 76. Based on the detection results of the sensors 61 to 65, the ADF-CPU 200 controls ON and OFF switching of the solenoids 81 and 82 and the rotation of the motors 71 to 76.

Hereinafter, the document transport operation of the ADF 13 will be described.

The first path 45 and the intermediate rollers 47 and 49 configure a first transport unit which turns over the document D taken out by the feeding rollers 43 and transports the document D to the reading portion 22 in the first direction. The second path 46 (including the inside path 461 and the outside path 462) and the intermediate rollers 49, 48, and 47 configure a second transport unit which transports the document taken out by the feeding rollers 43 to the reading portion 22 in the second direction opposite to the first direction, and transports the document to the reading portion 22 in the first direction after turning over the document D passed through the reading portion 22.

Figure 4A:
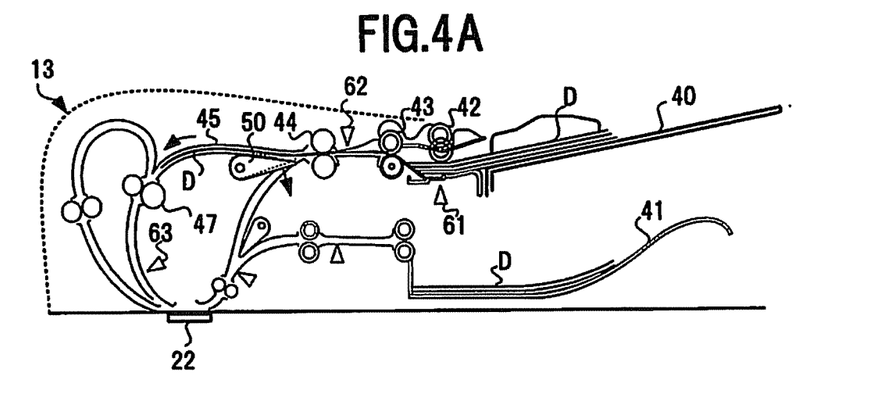
FIGS. 4A to 4C are illustrative views illustrating the operation of the automatic document feeder performed when a single side is read.
Figure 4B:
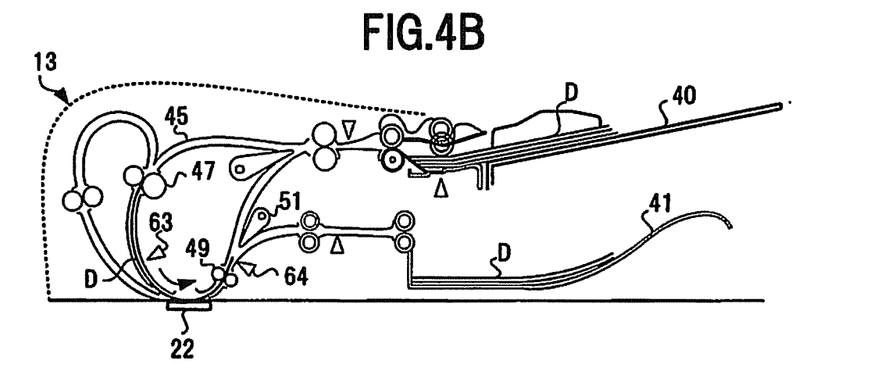
Figure 4C:
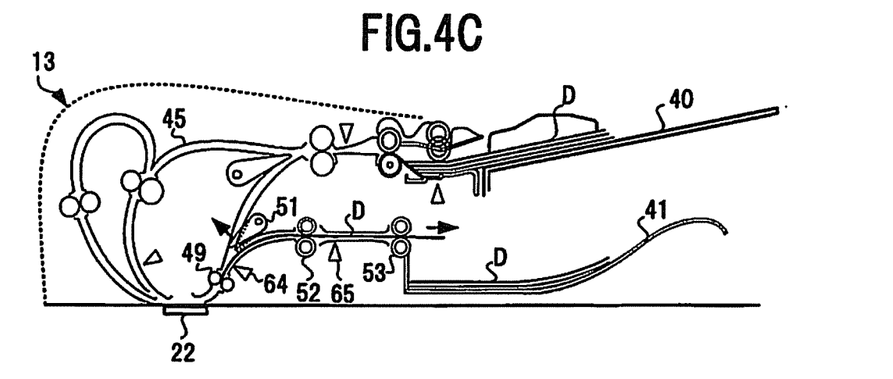

FIGS. 4A to 4C illustrate the operation of a first mode of reading the image on one side of the document. The document D is loaded on the document tray 40 while the side having the image faces upward. Whether or not one-side reading will be performed is determined when the user operates the operation panel 14, and the document D is transported under the control of the ADF-CPU 200.

In the first mode of the one-side reading, first, the document D picked up by the pickup rollers 42 is transported to the resist rollers 44 from the feeding rollers 43, as shown in FIG. 4A. The sensor 61 detects a state where the document is set, and the sensor 62 detects a state where the document D is transported. In response to the detection result of the sensor 62, the ADF-CPU 200 controls the solenoid 81 to move the leading end of the gate 50 downwardly by rotating the leading end clockwise, thereby causing the document D to pass toward the first path 45.

As shown in FIG. 4B, the document D is transported toward the reading portion 22 by the intermediate rollers 47, and the image on the front side of the document D is read by the scanner unit 17. The sensor 63 can detect a state where the document D is close to the reading portion 22. After a pre-set time passed from when the sensor 63 detects the document D, the scanner unit 17 starts reading the document. When the sensor 64 detects the transportation of the document D, the ADF-CPU 200 controls the solenoid 82 to rotate the leading end of the gate 51 clockwise.

As shown in FIG. 4C, the document D of which image reading is finished is discharged to the paper discharge tray 41 by the intermediate rollers 49 and the paper discharge rollers 52 and 53. The intermediate rollers 49 perform normal rotation to discharge the document D. The document D passed through the paper discharge rollers 52 is detected by the sensor 65.

In this manner, the completion of the reading of a first document can be detected. If there is a second document, one side of the document is read in the flow of the FIGS. 4A to 4C in the same manner. If there is no document anymore in the document tray 40, the sensor 61 detects this state, whereby the reading of the document ends.

Next, a second mode of reading images on both sides of the document will be described with reference to FIGS. 5A to 5C.

First, the document is loaded on the document tray 40. The document D is loaded while the front side having an image faces upward. Whether double-side reading will be performed is determined when the user operates the operation panel 14.

Figure 5A:
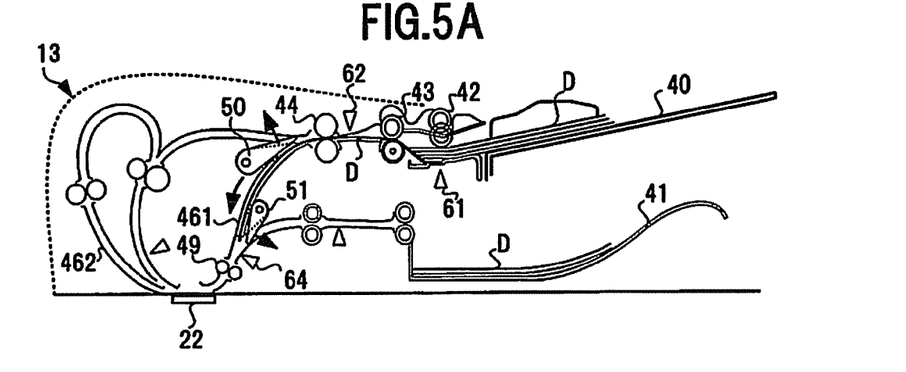
FIGS. 5A to 5C are illustrative views illustrating the operation of the automatic document feeder performed when both sides are read.

As shown in FIG. 5A, the document D picked up by the pickup rollers 42 is transported to the resist rollers 44 from the feeding rollers 43. The sensor 61 detects a state where the document is set, and the sensor 62 detects a state where the document D is transported.

In response to the determination result of the double-sided printing mode and the detection result of the sensor 62, the ADF-CPU 200 controls the solenoid 81 to move the leading end of the gate 50 upwardly by rotating the leading end counter clockwise, thereby causing the document D to pass toward the inside path 461. The ADF-CPU 200 also controls the solenoid 82 to rotate the leading end of the gate 51 counter clockwise.

Figure 5B:
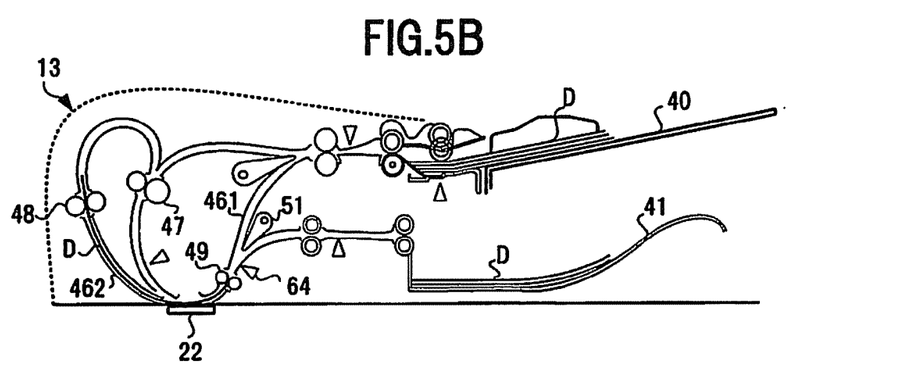

As shown in FIG. 5B, the document D is transported toward the reading portion 22 due to the inverse rotation of the intermediate rollers 49, and the image on the back side of the document ID is read by the scanner unit 17. The sensor 64 can detect a state where the document D is close to the reading portion 22, and after a pre-set time passes from when the sensor 64 detects the document D, the scanner unit 17 starts reading the back side of the document.

Figure 5C:
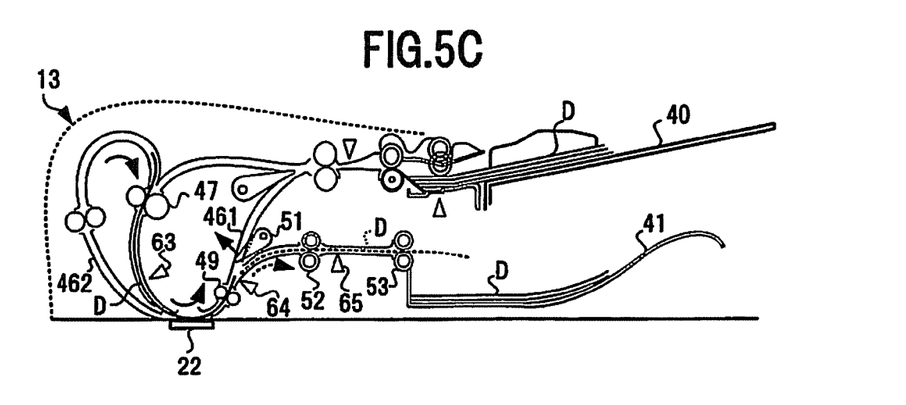

Furthermore, as shown in FIG. 5C, the document D of which the reading of the back side is finished passes through the outside path 462, is turned over by the intermediate rollers 48 and 47, and is transported toward the reading portion 22. The image on the front side of the document D is read by the scanner unit 17. The sensor 63 can detect a state where document D is close to the reading portion 22, and after a pre-set time passes from when the sensor 63 detects the document ID, the scanner unit 17 starts reading the front side of the document.

The document D in which the reading of the front side image is finished is transported by the intermediate rollers 49 performing normal rotation. When the sensor 64 detects the document ID, the ADF-CPU 200 controls the solenoid 82 to rotate the gate 51 clockwise. Thereafter, as indicated by the dotted line, the document D is discharged to the paper discharge tray 41 by the paper discharge rollers 52 and 53. The document D passed through the paper discharge rollers 52 is detected by the sensor 65.

In this manner, the completion of the reading of a first document can be detected. If there is a second document, both sides of the document are read in the flow of the FIGS. 5A to 5C in the same manner. If there are no more documents in the document tray 40, the sensor 61 detects this state, whereby the reading of the document ends.

According to the embodiments described above, the document transport path is switched between the first mode of one-side reading and the second mode of double-side reading. In the first mode, the image can be read by causing the document D to pass through the first path 45, and transporting the document in page order. Furthermore, in the second mode, the document D is caused to pass through the second path 46, the image on the back side is read, and then the image on the front side is read. Accordingly, the image can be smoothly read.

The image data read by the scanner unit 17 is sequentially stored in a page memory in order of back side and front side. However, if the image data of the front side stored in the page memory is read first, and then the image data of the back side is read, possible to process the image data in order. The image data read from the page memory can be processed and printed by the printer unit 23.

In both the first and second modes, the document can be discharged to the paper discharge tray 41 while the front side faces downward in the same page order as before the document is fed. Moreover, in the second mode, since the operation in which the document is switched back to perform the idle reverse is not necessary, the image can be read rapidly.

While certain embodiments have been described, these embodiments have been presented by way of example only, and are not intended to limit the scope of the invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An automatic document feeder comprising:
    a document tray loaded with a document,
    a first transport unit transporting the document fed from the document tray to a reading portion in a first transportation direction after turning over the document,
    a second transport unit transporting the document supplied from the document tray to the reading portion in a second transportation direction opposite to the first transportation direction, and transporting the document passed through the reading portion to the reading portion in the first transportation direction after turning over the document, a first gate sorting the document to transport the document to the first transport unit when an image on one side of the document is read, and to transport the document to the second transport unit when images on both sides of the document are read, and a paper discharge tray to which the document is discharged after the document is transported to the reading portion in the first transportation direction.

2. The apparatus of claim 1,
wherein the first transport unit includes a first transport path guiding the document to the reading portion in the first transportation direction, and first intermediate rollers disposed in the middle of the first transport path and transporting the document to the reading portion.

3. The apparatus of claim 1,
wherein the second transport unit includes an inside path in which the document passes through the inside of the first transport unit and is guided to the reading portion in the second transportation direction, an outside path in which the document passed through the reading portion is turned over while passing around the outside of the first transport unit and is guided to the reading portion in the first transportation direction, and second and third intermediate rollers disposed respectively in the inside path and the outside path and transporting the document to the reading portion.

4. The apparatus of claim 3,
wherein a second gate is provided in an outlet portion of the first transport unit and an outlet portion of the inside path and sorts the document to discharge the document to the paper discharge tray or to transport the document to the reading portion through the inside path.

5. The apparatus of claim 3,
wherein the third intermediate rollers change the rotation direction to discharge the document from the first transport unit and to transport the document from the inside path to the reading portion.

6. The apparatus of claim 3,
wherein the outlet of the outside path meets the midway position of the first transport unit.

7. The apparatus of claim 1, further comprising:
a feeding tray taking the document out of the document tray; and
resist rollers aligning the leading end of the document fed from the feeding tray,
wherein the first gate is provided in the outlet of the resist rollers.

8. A method of transporting a document comprising:
transporting a document fed from a document tray to a reading portion in a first transportation direction after turning over the document using a first transport unit;
transporting the document fed from the document tray to the reading portion by using a second transport unit in a second transportation direction opposite to the first transportation direction;
transporting the document passed through the reading portion to the reading portion in the first transportation direction after turning over the document;
sorting the document using the first gate to transport the document to the first transport unit when an image on one side of the document is read, and to transport the document to the second transport unit when images on both sides of the document are read; and discharging the document to a paper discharge tray after the document is transported to the reading portion in the first transportation direction.

9. The method of claim 8,
wherein the first transport unit guides the document to the reading portion in the first transportation direction after turning over the document using a first transport path, and
transports the document to the reading portion by using first intermediate rollers disposed in the middle of the first transport path.

10. The method of claim 8,
wherein the second transport unit guides the document by using an inside path in which the document passes through the inside of the first transport unit and is guided to the reading portion in the second transportation direction,
guides the document by using an outside path in which the document passed through the reading portion is turned over while passing around the outside of the first transport unit and is guided to the reading portion in the first transportation direction, and
transports the document to the reading portion by using second and third intermediate rollers disposed respectively in the inside path and the outside path.

11. The method of claim 10,
wherein a second gate is provided in an outlet portion of the first transport unit and an outlet portion of the inside path and sorts the document to discharge the document to the paper discharge tray or to transport the document to the reading portion through the inside path.

12. The method of claim 10,
wherein the third intermediate rollers change the rotation direction to discharge the document from the first transport unit and to transport the document from the inside path to the reading portion.

13. The method of claim 10,
wherein the outlet of the outside path of the second transport unit meets the midway position of the first transport unit.

14. The method of claim 8,
wherein the document is taken out of the document tray by a feeding tray,
the leading end of the document from the feeding tray is aligned by resist rollers, and
the document from the resist rollers is sorted to be transported to the first or second transport unit by the first gate provided in the outlet of the resist rollers.

15. An image reading apparatus comprising:
a document tray loaded with a document;
a first transport unit transporting the document fed from the document tray to a reading portion in a first transportation direction after turning over the document;
a second transport unit transporting the document fed from the document tray to the reading portion in a second transportation direction opposite to the first transportation direction, and transporting the document passed through the reading portion to the reading portion in the first transportation direction after turning over the document;
a first gate sorting the document to transport the document to the first transport unit in a first mode in which an image on one side of the document is read, and to transport the document to the second transport unit in a second mode in which images on both sides of the document are read;

a paper discharge tray to which the document is discharged after the document is transported to the reading portion in the first transportation direction; and a scanner unit which reads an image on the document transported to the reading portion wherein, in the first mode, an image on the front side of the document transported in the first direction is read, and in the second mode, an image on the back side of the document transported in the second transportation direction and an image on the front side of the document transported in the first transportation direction are read.

16. The apparatus of claim 15, further comprising:

a first sensor detecting the document transported to the reading portion in the first transportation direction; and a second sensor detecting the document transported to the reading portion in the second transportation direction, wherein the scanner unit starts reading the image on the document based on the detection results of the first and the second sensors.

17. The apparatus of claim 15, further comprising:

a feeding tray taking the document out of the document tray;

resist rollers aligning the leading end of the document fed from the feeding tray; and a third sensor detecting a state where the document is transported to the resist rollers, wherein the first gate is switched based on the detection result of the third sensor.

18. The apparatus of claim 15, wherein the second transport unit includes an inside path in which the document passes through the inside of the first transport unit and is guided to the reading portion in the second transportation direction, and an outside path in which the document passed through the reading portion is turned over while passing around the outside of the first transport unit and is guided to the reading portion in the first transportation direction, and a second gate is provided in an outlet portion of the first transport unit and the inside path, and is switched to discharge the document to the paper discharge tray or to transport the document to the reading portion through the inside path.

19. The apparatus of claim 18, wherein the outlet of the outside path meets the midway position of the first transport unit.

20. The apparatus of claim 15, further comprising:

a memory storing the image data read by the scanner unit, wherein, in the second mode, the image data of the back side is read after the image data of the front side is read from the memory.

21. The apparatus of claim 1, wherein the second transport unit transporting the document without a switched back.

* * * * *